(12) United States Patent
Ying et al.

(10) Patent No.: US 9,893,525 B1
(45) Date of Patent: Feb. 13, 2018

(54) HIGH-POWER CONVERSION SYSTEM

(71) Applicant: Delta Electronics (Shanghai) Co., Ltd., Shanghai (CN)

(72) Inventors: Jianping Ying, Shanghai (CN); Hongjian Gan, Shanghai (CN); Teng Liu, Shanghai (CN); Lifeng Qiao, Shanghai (CN); Yong Zeng, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/464,324

(22) Filed: Mar. 20, 2017

(30) Foreign Application Priority Data

Aug. 5, 2016 (CN) .......................... 2016 1 0637830

(51) Int. Cl.
*H02M 5/40* (2006.01)
*H02J 3/18* (2006.01)
*H02J 3/36* (2006.01)

(52) U.S. Cl.
CPC .................................. *H02J 3/1864* (2013.01)

(58) Field of Classification Search
CPC ........ H02M 5/45; H02M 5/451; H02M 5/452; H02M 5/453; H02M 5/458; H02M 5/40; H02J 3/36; H02J 5/00
See application file for complete search history.

(56) References Cited

U.S. PATENT DOCUMENTS

| 4,602,308 | A | * | 7/1986 | Montague | ................ | H02H 9/04 361/110 |
|---|---|---|---|---|---|---|
| 6,181,124 | B1 | * | 1/2001 | McQueen | ............. | H01F 27/346 323/356 |

* cited by examiner

*Primary Examiner* — Gary L Laxton
(74) *Attorney, Agent, or Firm* — CKC & Partners Co., Ltd.

(57) ABSTRACT

A high-power conversion system includes a switching circuit and at least one reactor, the at least one reactor being electrically connected to the switching circuit, and the core of the at least one reactor being electrically connected to a potential point of the high-power conversion system.

18 Claims, 7 Drawing Sheets

(Prior Art)

HIGH-POWER CONVERSION SYSTEM

CROSS-REFERENCE TO RELATED APPLICATIONS

This non-provisional application claims priority under 35 U.S.C. § 119(a) on Patent Application No. 201610637830.4 filed in P.R. China on Aug. 5, 2016, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present disclosure relates to a high-power conversion system, and particularly to a high-power conversion system comprising reactors, of which the cores are connected to some fixed potential structures of a high-power supply.

BACKGROUND ART

With the rapid development of modern power electronic technologies and microelectronic technologies, high-voltage high-power supplies are being continuously improved. Input reactors, output reactors and the like need be used in high-voltage high-power supplies. In high-voltage high-power supplies, the cores of the existing reactors are grounded, when their voltages are higher, the volumes of the reactors are larger, the costs of the reactors are higher. This is a challenge for high-power supplies which require high efficiency, high power density, high reliability and low costs.

Figure 1:
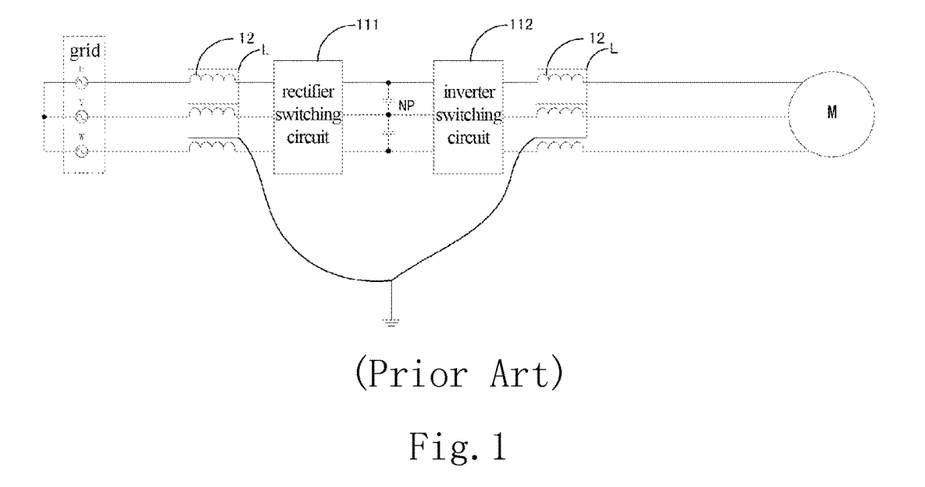
FIG. 1 is a schematic view showing a structure wherein the cores of the reactors of a high-power conversion system in the prior art are grounded.

Referring to FIG. 1, which is a schematic view showing a structure wherein the cores of the reactors of a high-power conversion system in the prior art are grounded. Generally speaking, the cores L of the reactors of the existing high-voltage high-power supply must be reliably grounded, and the grounding mode is shown in FIG. 1. If they are not grounded, the floating voltage of the cores to the ground will result in the intermittent breakdown and discharge of the cores to the ground; if the cores are all grounded, the possibility of forming core floating potential will be eliminated. If the cores of reactors are reliably grounded, then the safety requirement on the windings to the cores of reactors is basic insulation. Moreover, in the existing high-power conversion system, the voltage between the grid side differential mode reactors and the ground is higher, and the electric clearance distances and creepage distances corresponding to basic insulation are more stringent compared to those corresponding to functional insulation, thereby resulting in higher volumes of reactors and higher costs of reactors.

Therefore, there is an urgent need to develop a connection structure for the cores of reactors that can overcome the above deficiencies.

DISCLOSURE OF THE INVENTION

The technical problem to be solved by the present disclosure is to provide a high-power conversion system, including a switch circuit and at least one reactor, the at least one reactor being electrically connected to the switch circuit, characterized in that the core of the at least one reactor is electrically connected to a potential point of the high-power conversion system.

EMBODIMENTS

As regards the details and technical description of the present disclosure, a preferred embodiment is provided for further illustration, but should not be construed as limiting the implementation of the present disclosure.

In the embodiments and claims of the present disclosure, any description relating to "connected" may generally mean that a component is indirectly connected to another one via other components, or a component is directly connected to another one without the use of other components.

Figure 2:
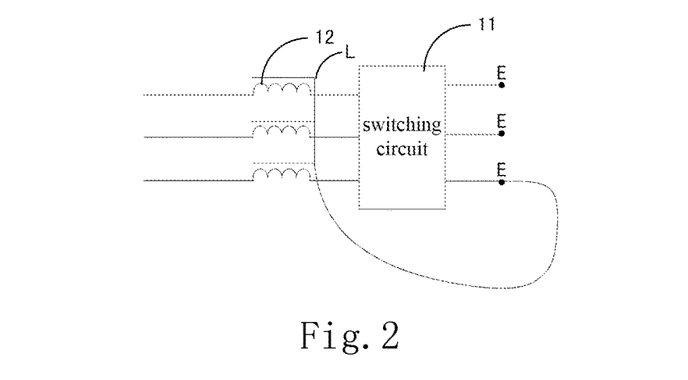
FIG. 2 is a schematic view showing the structure of the high-power conversion system in the first embodiment of the present disclosure.

Referring to FIG. 2, FIG. 2 is a schematic view showing the structure of the high-power conversion system according to the first embodiment of the present disclosure. As shown in FIG. 2, the high-power conversion system according to the present disclosure includes a switching circuit 11 and an reactor 12, the reactor 12 is electrically connected to the switching circuit 11, and the core L of the reactor 12 is electrically connected to any one of a plurality of potential points E of the high-power conversion system.

Figure 3:
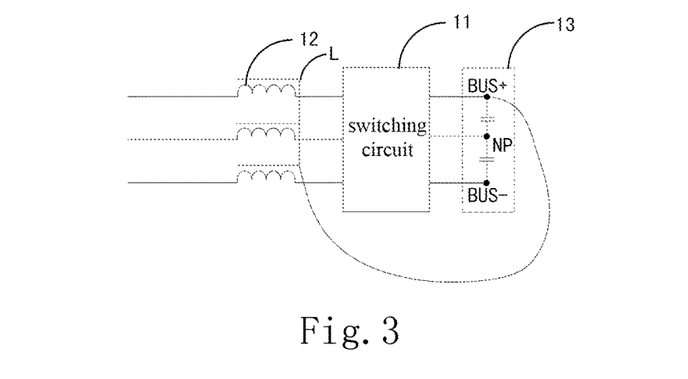
FIG. 3 is a schematic view showing the structure of the high-power conversion system in the second embodiment of the present disclosure.
Figure 4:
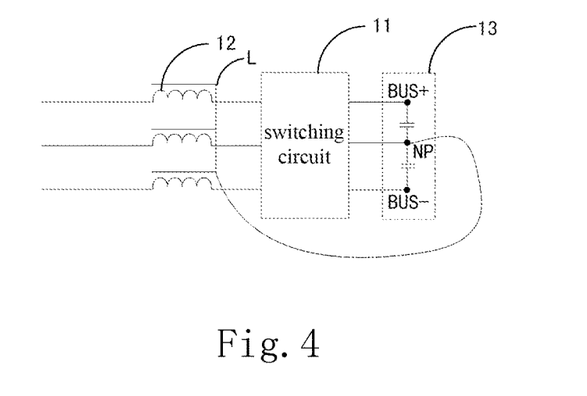
FIG. 4 is a schematic view showing the structure of the high-power conversion system in the third embodiment of the present disclosure.
Figure 5:
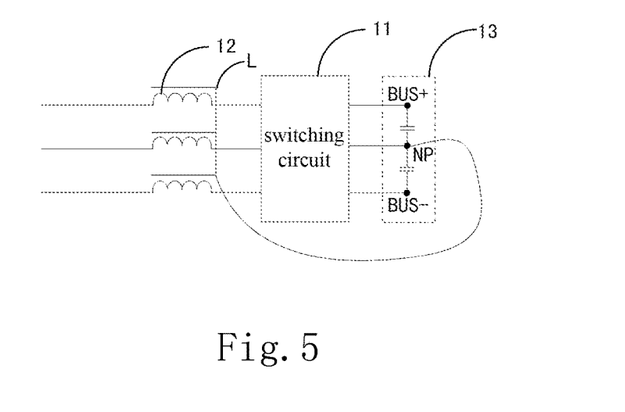
FIG. 5 is a schematic view showing the structure of the high-power conversion system in the fourth embodiment of the present disclosure.

Referring to FIGS. 3-5, FIG. 3 is a schematic view showing the structure of the high-power conversion system according to the second embodiment of the present disclosure; FIG. 4 is a schematic view showing the structure of the high-power conversion system according to the third embodiment of the present disclosure; and FIG. 5 is a schematic view showing the structure of the high-power conversion system according to the fourth embodiment of the present disclosure. As shown in FIGS. 3-5, the high-power conversion system according to the present disclosure further comprises a bus capacitor modules 1/3 electrically connected to said switching circuit 11, wherein said bus capacitor modules 13 comprises a positive DC bus terminal BUS+, a negative DC bus terminal BUS− and a neutral terminal NP, wherein said positive DC bus terminal BUS+ is a first potential point of the high-power conversion system, said negative DC bus terminal BUS− is a second potential point of the high-power conversion system, said neutral terminal NP is a third potential point of the high-power conversion system, and the core L of said reactor 12 is electrically connected to one of said first potential point, said second potential point and said third potential point. The core L of the reactor 12 is electrically connected to the first potential point in FIG. 3; the core L of the reactor 12 is electrically connected to the second potential point in FIG. 4; and the core L of the reactor 12 is electrically connected to the third potential point in FIG. 5. In other embodiments, the bus capacitor modules 13 only comprises the positive DC bus terminal BUS+ and the negative DC bus terminal BUS−, wherein the positive DC bus terminal BUS+ is a first potential point of the high-power conversion system, the negative DC bus terminal BUS− is a second potential point of the high-power conversion system, and the core L of the reactor 12 is electrically connected to one of the first potential point and the second potential point.

Figure 6:
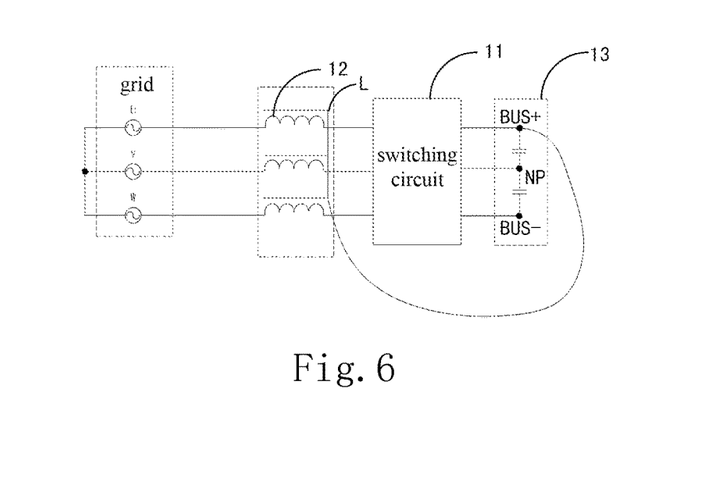
FIG. 6 is a schematic view showing the structure of the high-power conversion system in the fifth embodiment of the present disclosure.
Figure 7:
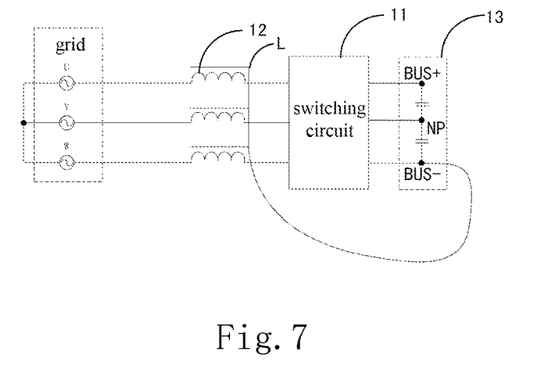
FIG. 7 is a schematic view showing the structure of the high-power conversion system in the sixth embodiment of the present disclosure.
Figure 8:
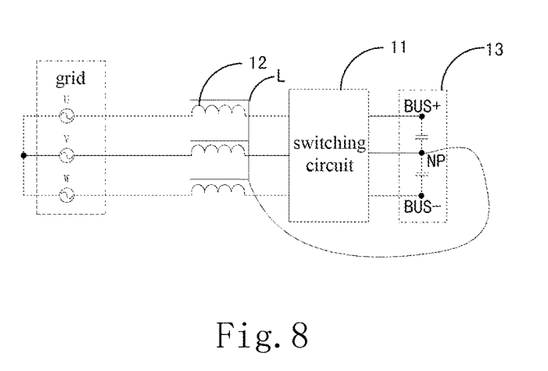
FIG. 8 is a schematic view showing the structure of the high-power conversion system in the seventh embodiment of the present disclosure.

Referring to FIGS. 6-8, FIG. 6 is a schematic view showing the structure of the high-power conversion system according to the fifth embodiment of the present disclosure; FIG. 7 is a schematic view showing the structure of the high-power conversion system according to the sixth embodiment of the present disclosure; and FIG. 8 is a schematic view showing the structure of the high-power conversion system according to the seventh embodiment of the present disclosure. As shown in FIGS. 6-8, the high-power conversion system is a Static VAR Generator (SVG) system, one terminal of the reactor 12 is electrically connected to a grid, the other terminal of the reactor 12 is electrically connected to the switching circuit 11, the bus capacitor modules 13 is electrically connected to the switching circuit 11, and the core L of the reactor 12 is electrically connected to one of the first potential point, the second potential point and the third potential point of the SVG system. The core L of the reactor 12 is electrically connected to the first potential point in FIG. 6; the core L of the reactor 12 is electrically connected to the second potential point in FIG. 7; and the core L of the reactor 12 is electrically connected to the third potential point in FIG. 8. In this embodiment, the reactor 12 is a three-phase reactor, of which three windings are respectively connected to Phase U, Phase V and Phase W of the grid.

Figure 9:
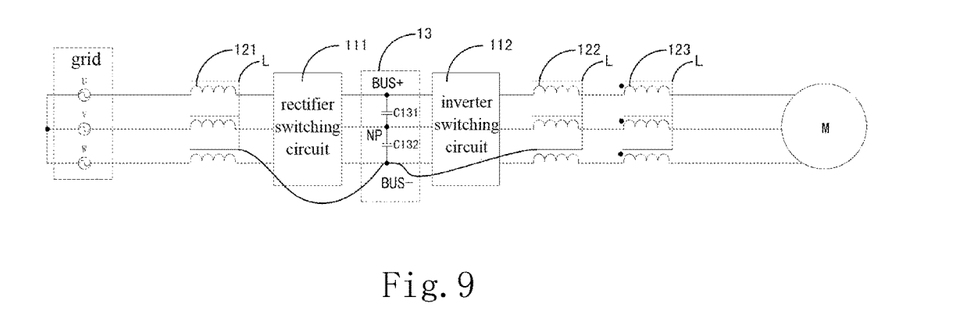
FIG. 9 is a schematic view showing the structure of the high-power conversion system in the eighth embodiment of the present disclosure.

Referring to FIG. 9, FIG. 9 is a schematic view showing the connection structure for the cores of reactors according to the eighth embodiment of the present disclosure. As shown in FIG. 9, the reactors 12 comprise a first reactor 121, a second reactor 122 and a third reactor 123, wherein said first reactor 121 and said second reactor 122 are differential mode reactors, and said third reactor 123 is a common mode reactor; the switching circuit 11 comprises a rectifier switching circuit 111 and an inverter switching circuit 112; one terminal of said rectifier switching circuit 111 is electrically connected to the grid via said first reactor 121, and the other terminal of said rectifier switching circuit 111 is electrically connected to said bus capacitor modules 13; one terminal of said inverter switching circuit 112 is electrically connected to said bus capacitor modules 13, and the other terminal of said inverter switching circuit 112 is electrically connected to a motor M via said second reactor 122 and said third reactor 123 that are connected serially, wherein all of said first reactor 121, said second reactor 122 and said third reactor 123 are three-phase reactors, and the three-phase windings of said first reactor 121 are respectively connected to Phase U, Phase V and Phase W of the grid; the three-phase windings of said second reactor 122 are connected to the three-phase windings of said third reactor 123, and the three-phase windings of said third reactor 123 are connected to the three-phase windings of said motor M. Said bus capacitor modules 13 comprises a first bus capacitor C131 and a second bus capacitor C132, of which said first bus capacitor C131 is electrically connected to the first potential point and the third potential point, and said second bus capacitor C132 is electrically connected to the second potential point and the third potential point; at least one of the cores L of said first reactor 121, said second reactor 122 and said third reactor 123 is electrically connected to one of said first potential point, said second potential point and said third potential point. In other embodiments, the bus capacitor modules 13 comprises bus capacitors, which are separately connected between the first potential point and the second potential point.

It is worth noting that this embodiment shows that both of the cores L of the first reactor 121 and the second reactor 122 are electrically connected to the second potential point; however, the present disclosure is not limited thereto, but comprises more other embodiments; for example, only the core L of the first reactor 121 is electrically connected to the first, second or third potential point; only the core L of the second reactor 122 is electrically connected to the first, second or third potential point; only the core L of the third reactor 123 is electrically connected to the first, second or third potential point; further, for example, only the cores L of the first reactor 121 and the second reactor 122 are electrically connected to the first or third potential point; the cores L of the first reactor 121 and the third reactor 123 are electrically connected to the first, second or third potential point; the cores L of the second reactor 122 and the third reactor 123 are electrically connected to the first, second or third potential point; moreover, all of the cores L of the first reactor 121, the second reactor 122 and the third reactor 123 are electrically connected to the first, second or third potential point.

Figure 10:
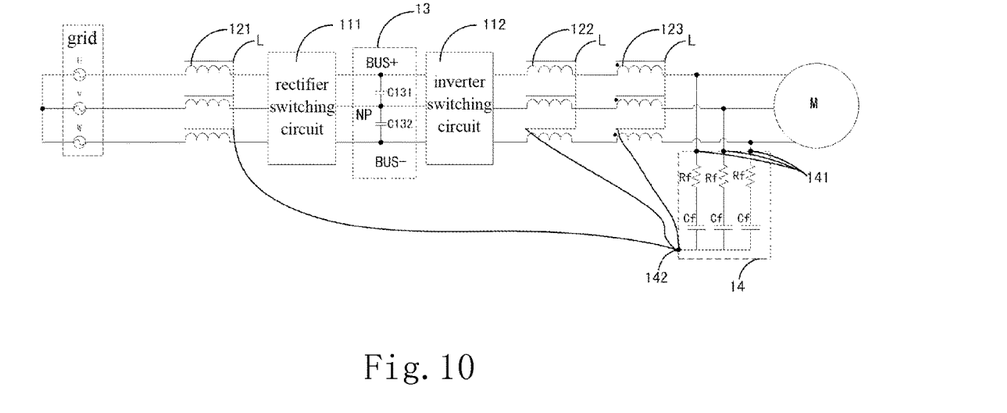
FIG. 10 is a schematic view showing the structure of the high-power conversion system in the ninth embodiment of the present disclosure.

Referring to FIG. 10, FIG. 10 is a schematic view showing the connection structure for the cores of reactors according to the ninth embodiment of the present disclosure. As shown in FIG. 10, the high-power conversion system further comprises a first RC filter network 14 which consists of a plurality of resistors Rf and a plurality of capacitors Cf. The first RC filter network 14 has a first terminal 141 and a second terminal 142, wherein said first terminal 141 is electrically connected to the three-phase windings of said third reactor 143 and the three-phase windings of said motor M, said second terminal 142 of said first RC filter network 14 is a fourth potential point of the high-power conversion system, and at least one of the cores L of said first reactor 121, said second reactor 122 and said third reactor 123 is electrically connected to the fourth potential point.

It is worth noting that this embodiment shows that all of the cores L of the first reactor 121, the second reactor 122 and the third reactor 123 are electrically connected to the fourth potential point; however, the present disclosure is not limited thereto, but comprises more other embodiments; for example, only the core L of the first reactor 121 is electrically connected to the fourth potential point; only the core L of the second reactor 122 is electrically connected to the fourth potential point; only the core L of the third reactor 123 is electrically connected to the fourth potential point; further, for example, only the cores L of the first reactor 121 and the second reactor 122 are electrically connected to the fourth potential point; the cores L of the first reactor 121 and the third reactor 123 are electrically connected to the fourth potential point; the cores L of the second reactor 122 and the third reactor 123 are electrically connected to the fourth potential point.

Figure 11:
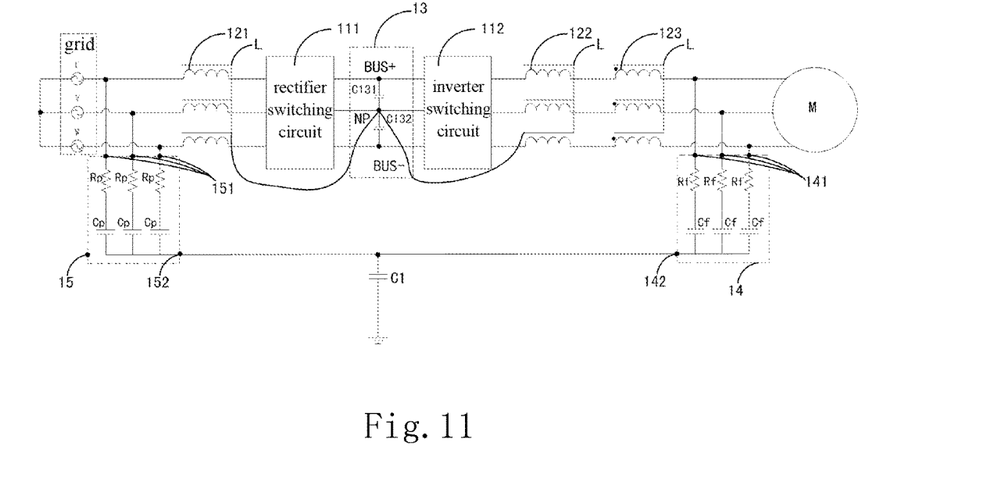
FIG. 11 is a schematic view showing the structure of the high-power conversion system in the tenth embodiment of the present disclosure.

Referring to FIG. 11, FIG. 11 is a schematic view showing the connection structure for the cores of reactors according to the tenth embodiment of the present disclosure. As shown in FIG. 11, the high-power conversion system not only comprises the first RC filter network 14 shown in FIG. 10, but also comprises a second RC filter network 15 which consists of a plurality of resistors Rp and a plurality of capacitors Cp. The second RC filter network 15 has a first terminal 151 and a second terminal 152, wherein said first terminal 151 is electrically connected to the three-phase windings of said first reactor 121 and Phase U, Phase V and Phase W of the grid, said second terminal 152 is electrically connected to the fourth potential point of the first RC filter network 14, the fourth potential point of the first RC filter network 14 and the second terminal 152 of the second RC filter network 15 are grounded through a first capacitor C1, the second terminal 152 of the second RC filter network 15 is a fifth potential point of the high-power conversion system, and at least one of the cores L of said first reactor 121, said second reactor 122 and said third reactor 123 is electrically connected to one of said first potential point, said second potential point and said third potential point.

It is worth noting that this embodiment shows that both of the cores L of the first reactor 121 and the second reactor 122 are electrically connected to the third potential point; however, the present disclosure is not limited thereto, but comprises more other embodiments; for example, only the core L of the first reactor 121 is electrically connected to the first, second or third potential point; only the core L of the second reactor 122 is electrically connected to the first, second or third potential point; only the core L of the third reactor 123 is electrically connected to the first, second or third potential point; further, for example, only the cores L of the first reactor 121 and the second reactor 122 are electrically connected to the first or second potential point; the cores L of the first reactor 121 and the third reactor 123 are electrically connected to the first, second or third potential point; the cores L of the second reactor 122 and the third reactor 123 are electrically connected to the first, second or third potential point; all of the cores L of the first reactor 121, the second reactor 122 and the third reactor 123 are electrically connected to the first, second or third potential point.

Figure 12:
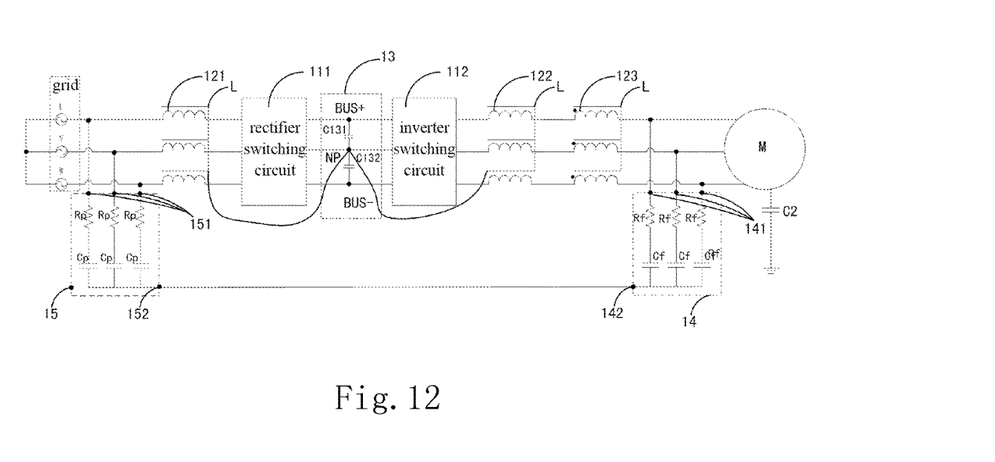
FIG. 12 is a schematic view showing the structure of the high-power conversion system in the eleventh embodiment of the present disclosure.

Referring to FIG. 12, FIG. 12 is a schematic view showing the connection structure for the cores of reactors according to the eleventh embodiment of the present disclosure. As shown in FIG. 12, the connection structure for the cores as shown in FIG. 12 differs from that as shown in FIG. 11 in that it comprises a second capacitor C2 but is not provided with a first capacitor C1, and the motor M is grounded through the second capacitor C2, wherein at least one of the cores L of the first reactor 121, the second reactor 122 and the third reactor 123 is electrically connected to one of the first potential point, the second potential point and the third potential point.

It is worth noting that this embodiment shows that both of the cores L of the first reactor 121 and the second reactor 122 are electrically connected to the third potential point; however, the present disclosure is not limited thereto, but comprises more other embodiments; for example, only the core L of the first reactor 121 is electrically connected to the first, second or third potential point; only the core L of the second reactor 122 is electrically connected to the first, second or third potential point; only the core L of the third reactor 123 is electrically connected to the first, second or third potential point; further, for example, only the cores L of the first reactor 121 and the second reactor 122 are electrically connected to the first or second potential point; the cores L of the first reactor 121 and the third reactor 123 are electrically connected to the first, second or third potential point; the cores L of the second reactor 122 and the third reactor 123 are electrically connected to the first, second or third potential point; moreover, all of the cores L of the first reactor 121, the second reactor 122 and the third reactor 123 are electrically connected to the first, second or third potential point.

Figure 13:
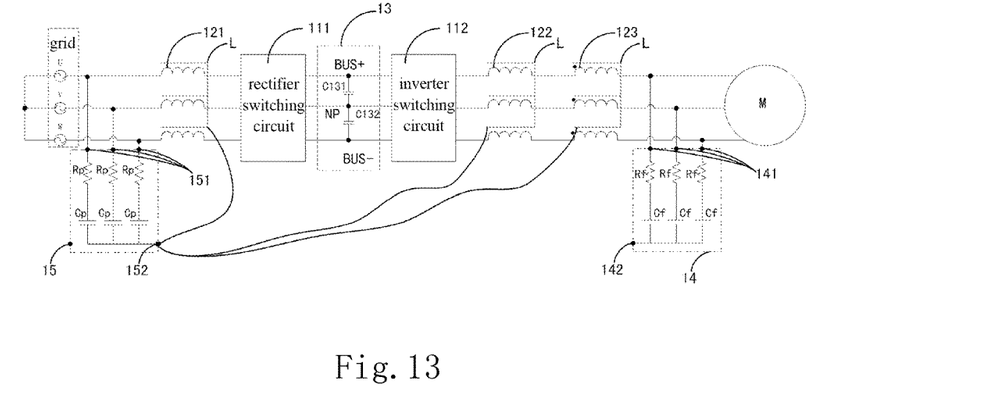
FIG. 13 is a schematic view showing the structure of the high-power conversion system in the twelfth embodiment of the present disclosure.

Referring to FIG. 13, FIG. 13 is a schematic view showing the connection structure for the cores of reactors according to the twelfth embodiment of the present disclosure. As shown in FIG. 13, the high-power conversion system comprises a first RC filter network 14 and a second RC filter network 15; however, the fourth potential point of the first RC filter network 14 is not electrically connected to the fifth potential point of the second RC filter network 15, and at least one of the cores L of said first reactor 121, said second reactor 122 and said third reactor 123 is electrically connected to the fifth potential point.

It is worth noting that this embodiment shows that all of the cores L of the first reactor 121, the second reactor 122 and the third reactor 123 are electrically connected to the fifth potential point; however, the present disclosure is not limited thereto, but comprises more other embodiments; for example, only the core L of the first reactor 121 is electrically connected to the fifth potential point; only the core L of the second reactor 122 is electrically connected to the fifth potential point; only the core L of the third reactor 123 is electrically connected to the fifth potential point; further, for example, only the cores L of the first reactor 121 and the second reactor 122 are electrically connected to the fifth potential point; the cores L of the first reactor 121 and the third reactor 123 are electrically connected to the fifth potential point; the cores L of the second reactor 122 and the third reactor 123 are electrically connected to the fifth potential point.

Figure 14:
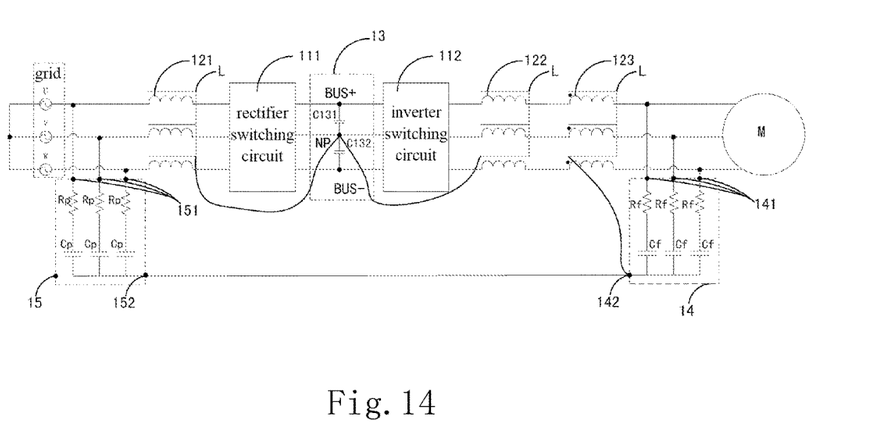
FIG. 14 is a schematic view showing the structure of the high-power conversion system in the thirteenth embodiment of the present disclosure.

Referring to FIG. 14, FIG. 14 is a schematic view showing the connection structure for the cores of reactors according to the thirteen embodiment of the present disclosure. As shown in FIG. 14, both of the cores L of the first reactor 121 and the second reactor 122 are electrically connected to the third potential point, and the core L of the third reactor 123 is electrically connected to the fourth potential point of the first RC filter network 14.

It is worth noting that this embodiment shows that both of the cores L of the first reactor 121 and the second reactor 122 are electrically connected to the third potential point, and the core L of the third reactor 123 is electrically connected to the fourth potential point of the first RC filter network 14; however, the present disclosure is not limited thereto, but comprises more other embodiments; for example, both of the cores L of the first reactor 121 and the second reactor 122 are electrically connected to the first potential point, and the core L of the third reactor 123 is electrically connected to the fourth potential point of the first RC filter network 14; alternatively, both of the cores L of the first reactor 121 and the second reactor 122 are electrically connected to the second potential point, and the core L of the third reactor 123 is electrically connected to the fourth potential point of the first RC filter network 14.

Figure 15:
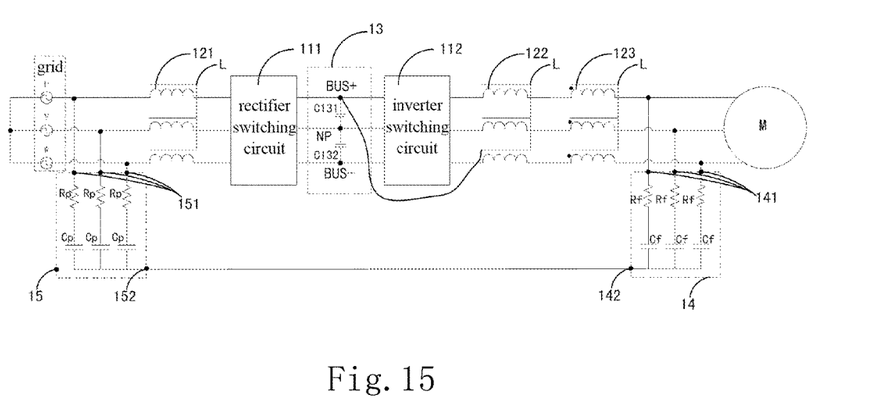
FIG. 15 is a schematic view showing the structure of the high-power conversion system in the fourteenth embodiment of the present disclosure.

Referring to FIG. 15, FIG. 15 is a schematic view showing the connection structure for the cores of reactors according to the fourteen embodiment of the present disclosure. As shown in FIG. 15, the core L of the second reactor 122 is electrically connected to the first potential point.

It is worth noting that this embodiment shows that only the core L of the second reactor 122 is electrically connected to the first potential point; however, the present disclosure is not limited thereto, but comprises more other embodiments; for example, only the core L of the second reactor 122 is electrically connected to the second, third or fourth potential point; or only the core L of the first reactor 121 is electrically connected to the first, second, third or fourth potential point; or only the core L of the third reactor 123 is electrically connected to the first, second, third or fourth potential point; or the cores L of the first reactor 121 and the second reactor 122 are electrically connected to the first, second, third or fourth potential point; or the cores L of the first reactor 121 and the third reactor 123 are electrically connected to the first potential point, the second potential point, the neutral terminal NP or the fourth potential point; the cores L of the second reactor 122 and the third reactor 123 are electrically connected to the first, second, third or fourth potential point; all of the cores L of the first reactor 121, the second reactor 122 and the third reactor 123 are electrically connected to the first, second, third or fourth potential point.

Figure 16:
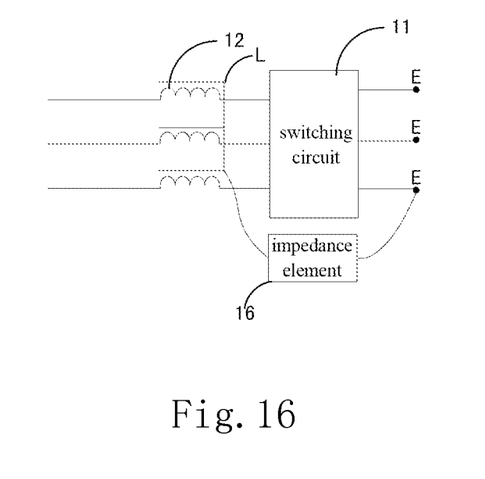
FIG. 16 is a schematic view showing the structure of the high-power conversion system in the fifteenth embodiment of the present disclosure.

Referring to FIG. 16, FIG. 16 is a schematic view showing the connection structure for the cores of reactors according to the fifteen embodiment of the present disclosure. As shown in FIG. 16, the connection structure for the cores as shown in FIG. 16 differs from that the cores L of the reactors 12 as shown in FIG. 2 are electrically connected to any one of a plurality of potential points E of the high-power conversion system via an impedance element 16, which is a resistor, an inductor, a capacitor or a serial-parallel circuit comprised of a resistor, an inductor, and a capacitor.

Figure 17:
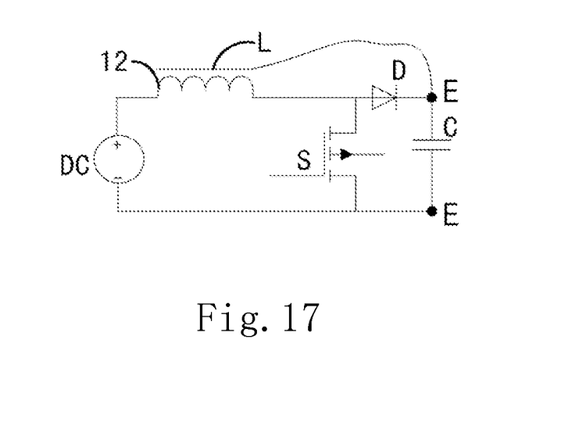
FIG. 17 is a schematic view showing the structure of the high-power conversion system in the sixteenth embodiment of the present disclosure.

Referring to FIG. 17, FIG. 17 is a schematic view showing the connection structure for the cores of reactors in the sixteen embodiment of the present disclosure. As shown in FIG. 17, the connection structure for the cores of reactors according to the present disclosure is not only used in the AC power supply circuits shown in FIGS. 6-16, but also can be applied to the DC power supply circuit shown in FIG. 17. One terminal of the reactor 12 is electrically connected to the DC power supply; the other terminal of the reactor 12 is electrically connected to the anode of a diode D and the source of a switch tube S; the cathode of the diode D is electrically connected to one terminal of the capacitor C, and the other terminal of the capacitor C is electrically connected to the drain of the switch tube S and the DC power supply; the core L of the reactor 12 is electrically connected to the potential point E.

The above are only the preferred embodiments of the present disclosure, but are not used for limiting the scope of the present disclosure. Those skilled in the art can make all kinds of corresponding changes and modifications according to the present disclosure without departing from the spirit and essence of the present disclosure. It is intended that all these changes and modifications be covered by the appended claims of the present disclosure.

What is claimed is:

1. A high-power conversion system, including a switching circuit and at least one reactor, the at least one reactor being electrically connected to the switching circuit, characterized in that core of the at least one reactor is electrically connected to a potential point of the high-power conversion system, wherein said potential point is ungrounded.

2. The high-power conversion system according to claim 1, characterized by further comprising a bus capacitor module electrically connected to said switching circuit, wherein said bus capacitor module includes a positive DC bus terminal and a negative DC bus terminal, said positive DC bus terminal is a first potential point, said negative DC bus terminal is a second potential point, and the core of said reactor is electrically connected to said first or second potential point.

3. The high-power conversion system according to claim 2, characterized in that said bus capacitor module further comprises a neutral terminal, said neutral terminal being a third potential point, and the core of said reactor being electrically connected to one of said first potential point, said second potential point and said third potential point.

4. The high-power conversion system according to claim 1, characterized in that said high-power conversion system is a Static VAR Generator (SVG) system, one terminal of said at least one reactor is electrically connected to a grid, and another terminal of said at least one reactor is electrically connected to said switch circuit.

5. The high-power conversion system according to claim 3, characterized in that said at least one reactor comprises a first reactor, a second reactor and a third reactor; and
said switching circuit comprises:
 a rectifier switching circuit, one terminal of said rectifier switching circuit is electrically connected to the grid via said first reactor, and another terminal of said rectifier switching circuit is electrically connected to said bus capacitor module; and
 an inverter switching circuit, one terminal of said inverter switching circuit is electrically connected to said bus capacitor module, and another terminal of said inverter switching circuit is electrically connected to a motor via said second reactor and said third reactor that are connected serially;
 wherein at least one of cores of said first reactor, said second reactor and said third reactor is electrically connected to one of said first potential point, said second potential point and said third potential point.

6. The high-power conversion system according to claim 5, characterized by further comprising a first RC filter network having a first terminal and a second terminal, wherein said first terminal is electrically connected to said third reactor and said motor, and said second terminal of said first RC filter network is a fourth potential point.

7. The high-power conversion system according to claim 6, characterized in that at least one of the cores of said first reactor, said second reactor and said third reactor is electrically connected to said fourth potential point.

8. The high-power conversion system according to claim 6, characterized by further comprising a second RC filter network having a first terminal and a second terminal, wherein said first terminal is electrically connected to said first reactor and said grid, and said second terminal is electrically connected to said second terminal of said first RC filter network.

9. The high-power conversion system according to claim 8, characterized in that said second terminal of said first RC filter network and said second terminal of said second RC filter network are grounded through a first capacitor.

10. The high-power conversion system according to claim 8, characterized in that said motor is grounded through a second capacitor.

11. The high-power conversion system according to claim 6, characterized by further comprising a second RC filter network having a first terminal and a second terminal, wherein said first terminal is electrically connected to said first reactor and said grid, and said second terminal of said second RC filter network is a fifth potential point.

12. The high-power conversion system according to claim 11, characterized in that at least one of the cores of said first reactor, said second reactor and said third reactor is electrically connected to said fifth potential point.

13. The high-power conversion system according to claim 8, characterized in that the cores of said first reactor and said second reactor are electrically connected to one of said first potential point, said second potential point and said third potential point, and the core of said third reactor is electrically connected to said fourth potential point.

14. The high-power conversion system according to claim 8, characterized in that at least one of the cores of said first reactor, said second reactor and said third reactor is electrically connected to one of said first potential point, said second potential point, said third potential point and said fourth potential point.

15. The high-power conversion system according to claim 1, characterized in that cores of the at least one reactors are electrically connected to the potential point of said high-power conversion system via an impedance element.

16. The high-power conversion system according to claim 15, characterized in that said impedance element is a resistor, an inductor, a capacitor or a serial-parallel circuit comprised of a resistor, an inductor, and a capacitor.

17. The high-power conversion system according to claim 5, characterized in that said first reactor and said second reactor are differential mode reactors, and said third reactor is a common mode reactor.

18. The high-power conversion system according to claim 3, characterized in that said bus capacitor module comprises a first bus capacitor and a second bus capacitor, said first bus capacitor and said second bus capacitor being connected serially to said neutral terminal.

* * * * *